United States Patent Office 3,525,672
Patented Aug. 25, 1970

3,525,672
LOW TEMPERATURE STABLE STARCH
PRODUCTS
Otto B. Wurzburg, Whitehouse Station, and Chester D.
Szymanski, Martinsville, N.J., assignors to National
Starch and Chemical Corporation, New York, N.Y., a
corporation of Delaware
No Drawing. Filed Feb. 17, 1967, Ser. No. 616,779
Int. Cl. C12b 1/00; C12c 11/04
U.S. Cl. 195—31         11 Claims

ABSTRACT OF THE DISCLOSURE

A method for the preparation of starch products characterized by improved stability and resistance to syneresis and gelling when exposed to low temperatures and repeated freeze-thaw cycles, wherein swollen, inhibited starch granules are treated with an enzyme capable of splitting the 1,4 linkages of the starch molecule but not the 1,6 linkages therein.

---

Starches which have been crosslinked in the granular state are used extensively as thickeners and stabilizers in foods such as pie fillings, salad dressing, gravies, puddings and soups, etc. The process of crosslinking granular starch is well known and involves reacting starch granules, normally in an aqueous slurry or dry state, and bi- or polyfunctional reagents, such as di-epoxides and di-anhydrides, etc., under conditions which will promote the reaction of the chemical with two or more of the hydroxyl groups present on the molecules within the granule. It is believed that intermolecular bridging or crosslinking is involved. Such crosslinked starches are often referred to as "inhibited" starches.

As a result of this cross linking reaction, the forces holding the granule together are reinforced with primary chemical bonds. Thus, when the granules are cooked in hot water and the normal granular forces are weakened or broken, the primary bonded crosslinks hold the swollen granule sufficiently intact to give short, salvelike textures. This crosslinking reaction will be discussed in greater detail subsequently.

Aqueous dispersions of crosslinked starch are often used under conditions which involve prolonged storage at relatively low temperatures and/or exposure to repeated freezing and thawing cycles. Thus, starch dispersions are used in fruit pie fillings, which are frequently canned, as well as in a number of frozen foods, such as frozen pies, soups and the like. In the case of canned food products, these are often stored in warehouses which have no heating facilities and may, therefore, be at very low temperatures for prolonged periods. As for frozen foods, they sometimes undergo repeated freezing and thawing cycles. Under such circumstances involving exposure to low temperature, there is a distinct loss in the hydrating power of the starch which is present in such food products thereby resulting in syneresis, or an exudation of liquid, together with a marked deterioration in the texture and clarity of the food product.

Attempts to overcome these difficulties have, in the past, involved the introduction of substituted branches onto the starch molecule by means of various chemical derivatization reactions. Although the latter method has somewhat improved the low temperature stability of satisfactory under conditions where the aqueous starch dispersions have been subjected to either long periods of low temperature storage or to a large number of continuous freeze-thaw cycles.

Another problem resulting from the use of this latter approach is that it may result in the introduction into the starch of certain substituent groups, such as the hydroxypropyl moiety, which may resist degradation by the digestive system. Thus, although low levels of substitution can be handled readily by the digestive system, when higher levels of substitution are employed in an effort to obtain further improvements in lower temperature stability, there is a retardation in the action of the starch digesting enzymes which act upon the food products containing these highly substituted starches. This latter effect seriously impairs the usefulness of such products for food purposes.

It is thus the prime object of this invention to provide a method for the modification of crosslinked starches with that their aqueous dispersions will be able to exhibit excellent resistance to the loss of clarity, texture and hydrating power which conventional crosslinked starches usually exhibit upon aging at low temperatures and upon exposure to repeated freeze-thaw cycles. Various other objects and advantages of this invention will become apparent to the practitioner from the following description.

Our invention comprises the subjection of crosslinked starch to the action of a specific type of enzyme, namely one which is capable of digesting the outer branches of the amylpectin molecule and whose action will not include or go beyond the 1.6 branching point in the amylopectin molecule as well as any substituent group which may be present in either the amylose or amylopectin molecules of the starch. Inasmuch as beta-amylase best meets the aforementioned requirements, its use is preferred for purposes of this invention. Although for purposes of brevity and convenience the term "beta-amylase" is used interchangeably with the term "enzyme," it is to be noted that other enzymes exhibiting the characteristics hereinabove described may also be used in the novel process of this invention.

It is further believed that by treating crosslinked starch with the specified type of enzyme, the outermost branches of the starch molecule are shortened or removed. Thus, the possibility of association on the part of these branches is lessened and it is believed that this accounts for the remarkable reduction in the objectional characteristics of syneresis and gelling in the starch products of this invention as contrasted with conventional crosslinked starches.

Starches are polymers of anhydroglucose units which are linked through alpha-glucosidic bonds. Most starches contain two types of polymers, namely amylose and amylopectin. The former is a linear polymer in which the monomeric units are linked essentially through alpha 1,4-glucosidic bonds. The presence of hydroxyl groups in the amylose chain imparts hydrophilic properties to the amylose polymer which leads to an affinity for moisture and a resulting solubility in hot water. However, since the amylose molecules are linear and contain hydroxyl groups, they have a tendency to be attracted to each other and to align themselves by the association, as, for example, by hydrogen bonding, through the hydroxyl groups on neighboring molecules. When this occurs, the affinity of the amylose polymers for water is reduced and, if the molecules are in solution, they will tend to come out of solution forming precipitates at dilute concentrations. These precipitates consist of three dimensional polymeric networks held together by spot hydrogen bonding particularly at higher concentrations where the motion of the amylose polymers and their ability to orient is more restricted. This phenomenon of molecular association through hydrogen bonding as manifested by crystallization from aqueous dispersions is commonly referred to as retrogradation. Thus, for example, the tendency of corn starch dispersions to become opaque on cooling and to form gels is the result of retrogradation of the amylose molecules which are present in corn starch.

Amylopectin, the other polymer which is present in the starch molecule, contains a predominance of 1,4 linked anhydroglucose units, but in addition, at about every 5th anhydroglucose unit there is a branch point extending from the 6 position of the anhydroglucose unit to the 1 position of the branching chain. Amylopectin is a larger polymer than amylose, and is believed to attain molecular weights in the millions. The highly branched structure of amylopectin keeps its molecules from approaching each other closely enough to permit the extensive hydrogen bonding necessary for retrogradation to occur. As a result, aqueous sols of amylopectin, or starches wherein amylopectin is the primary or sole component, are characterized by good clarity and stability. The stability of amylopectin sols is a major factor in the use of amylopectin-rich starches as thickeners and in other applications where stable sols are desired.

Whether dealing with a starch which contains essentially only amylopectin, such as waxy maize or waxy sorghum, or with amylose-containing root starches, or even amylose-containing cereal starches which have been stabilized by the introduction of substituent groups, one finds that aqueous dispersions of such starches tend to suffer from loss of clarity, poor texture and syneresis when subjected to prolonged storage at low temperatures or to freeze-thaw cycles. This instability is believed to be due to the association of the outer branches of the amylopectin component.

By treating dispersions of crosslinked starches with beta-amylase, and particularly by treating those starches essentially consisting entirely of amylopectin, these outer branches can be shortened to the point where they will no longer associate with other branches. As previously indicated, crosslinked starches and crosslinked starch derivitives which have been treated in this manner show vastly improved resistance to change when their dispersions, or products containing them, are stored at low temperatures and/or under freeze-thaw conditions.

Beta-amylase is a very specific enzyme which, by its action, is able to form a reaction complex only with a maltoside group which is linked to a glucose group via a 1,4 alpha-glucosidic linkage. Thus, the enzyme attacks starch only at the non-aldehydic end, i.e. the non-reducing end, thereby splitting off maltose units from these outer branches until a point of branching, i.e. a 1,6 linkage, is reached. Since this enzyme is capable of splitting the 1,4 linkages of the starch molecule but is not capable of splitting the 1,6 linkages present therein, the residue of such a degradation procedure is a compact structure which is either entirely free of outer branches or which contains only short outer branches. This product is thus devoid of long outer chains which cause the gelling and syneresis evident in aqueous starch dispersions which have been exposed to low temperatures and/or repeated freeze-thaw cycles. Furthermore, as a result of the cross-linking, the resulting product retains sufficient granular structure to provide the rheology characteristics desired in many food applications.

The enzyme treatment utilized in the process of this invention is preferably conducted upon crosslinked starches which have been partially swollen. These crosslinked, swollen starches may, in turn, be derived from raw starch bases obtained from such plant sources as corn, potato, sweet potato, wheat, rice, sago, tapioca, sorghum or the like, and preferably those starches which contain, essentially, only amylopectin such as waxy corn, waxy rice and waxy sorghum. As will be discussed in greater detail hereinafter, it is also possible to employ any substituted ether or ester derivative of these starch bases for the preparation of the crosslinked, pregelatinized intermediates.

In order to inhibit, i.e. to crosslink, any of the aforementioned raw starch bases, it is ordinarily necessary to react the starch with a crosslinking agent by means of an etherification, esterification, or acetal formation procedure or by a combination of the latter procedures. These crosslinking agents include: aliphatic halides such as propylene dichloride, dichloropentane, ethylene dibromide, glycerol dichlorohydrin and dichlorobutane; ether forming epoxy halogen compounds such as epichlorohydrin, and epibromohydrin; certain polyfunctional reagents such as cyanuric chloride, phosphorus oxychloride, metaphosphates and polymetaphosphates; aldehydes such as formaldehyde, acrolein and formaldehyde containing resins and prepolymers; succinic anhydride; mixtures of adipic or citric acid with acetic anhydride; and, glycine-chlorine reagents. In general, these crosslinking agents may be defined as compounds containing at least two functional groups which can react with at least two available hydroxy groups of the starch molecule or molecules and thus alter the cooking characteristics of the resulting starch product.

With respect to the actual preparation of the inhibited starches, reference may be made to a number of U.S. patents relating to various inhibition processes. These include, among others: U.S. 2,500,950, which covers the use of dihalides and epoxy halogen compounds; U.S. 2,805,220, which cover the use of cyanuric chloride; U.S. 2,801,242, which covers the use of mixtures of meta and polymetaphosphates; U.S. 2,461,139, which covers the use of mixtures of adipic or citric acid with acetic anhydride; and, U.S. 2,328,537, which covers the use of phosphorous oxychloride.

The amount of crosslinking reagent needed for the reaction is determined by the desired granule swelling power (GSP) of the resulting crosslinked starch. Granule swelling power is a measure of the extent of granule inhibition, and may be defined as the amount of swollen, hydrated paste per gram of anhydrous starch in the paste which is formed by cooking starch in water under specific conditions.

The GSP is determined, in practice by dispersing one gram of starch (anhydrous weight) in enough distilled water to give a total weight of 100 grams. Normally, the starch is suspended in this water, stirred over a boiling water bath for five minutes, and then covered for the remainder of the cooking cycle which involves a total time of one hour. After cooking is complete, the sample is readjusted to a weight of 100 grams and transferred, quantitatively, into graduated 100 ml. centrifuge cups. The sample is then centrifuged at 2000 r.p.m. for exactly 20 minutes and the starch dispersion is removed as a clear supernate and a compacted swollen paste. The wet weight of the swollen paste is determined directly after the decantation of the supernate and the amount of dry solids in the supernate is determined by evaporation. The granule swelling power is then calculated by the formula:

$$GSP = \frac{\text{Wet weight of swollen paste} \times 100}{\text{Weight of dry starch (100\% of solubles)}}$$

Although this procedure was used to determine the GSP values in the examples given below, it is to be noted that the techniques for determining GSP need not necessarily be limited to the above described cooking conditions. Rather, the precise method of GSP determination will depend upon the nature of the inhibited starch and the manner in which it is to be used.

In order to function effectively in the process of this invention, the applicable inhibited starches should have a GSP value in the range of from about 10 to 31 since within this range they appear to provide the optimum thickening and rheological properties for most food applicatons. Therefore, the quantity of crosslinking reagent to be used in the inhibition process may be defined as that amount required to obtain a product having a GSP of between 10 and 31. As these reagents all differ in their reactivity with starch, the optimum proportions will be different for each reagent. It should be noted, however, that excessive inhibition which lowers the GSP values appreciably below 10, results in the preparation of starch products which will not thicken adequately so as to be of any value in food systems where improved low temperature staibility is desired. Excessive crosslinking may also inhibit the swelling of the granules to the point where the beta-amylase cannot penetrate sufficiently so as to be able to digest the external branches and thus impart the desired low temperature stability.

In addition to the previously described inhibition procedure, it is sometimes advantageous to partially derivatize the starch bases, i.e. to attach substituent groups to the starch base which are applicable for use in the process of this invention. Derivatization serves to open the granule, making the external branches more accessible to enzyme. Furthermore, derivation of the starch molecule reduces its linearity and thus serves as an additional factor which prevents the association of these groups. The resulting substituent groups on the starch molecule are not removed by the enzyme treatment since these groups function as branching points which the enzyme is incapable of by-passing. Typical substituent groups include ester groups such as acetate, succinate, phosphate and sulfate groups as well as ether group such as hydroxypropyl, hydroxyethyl and carboxymethyl groups; methods for the attachment of the latter groups being well known to those skilled in the art. The derivatization reaction may follow the crosslinking reaction, it may be carried on simultaneously with the crosslinking, or it may precede the crosslinking reaction depending upon reaction conditions and processing preferences.

The final step in preparing the starch intermediates applicable for the use in the enzyme reaction of this invention involves swelling the intact starch granules sufficiently to aid the enzyme in attacking the outer branches of the amylopectin. This may be accomplished by any of the usual techniques for swelling aqueous starch suspensions including cooking in steam heated or jacketed kettles; the use of so-called jet cookers or continuous heat exchangers; by peptizing reactions involving chemical treatment as, for example, with caustic solutions; or, by the use of drum drying or an analogous drying method. In the latter drum drying procedure, an aqueous slurry of the crosslinked starch is passed over heated rollers which raise the temperature of the slurry above the gelatinization point of the starch present therein while also evaporating the water therefrom so as to ultimately yield dry, solid particles of pregelatinized starch. The drum drying condition, e.g. temperature and drum speeds, under which the starch is gelatinized and dried will, of course, vary according to the particular starch base, the degree of crosslinking therein and the degree of granule swelling which is desired. Other drying techniques which are also applicable include spray drying and centrifugation. Although, in most instances, the moist, swollen starch will be treated with the enzyme directly, the drying of the starch enables it to be dispersed at higher solids contents.

Tht reaction conditions under which the swollen, crosslinked starch intermediate is treated with beta-amylase may vary widely. In general, the starch is slurried in an aqueous solution which usually contains additional ingredients therein. Thus, if the starch is peptized with caustic the pH may be reduced with an additive such as hydrochloric or acetic acid or an acidic salt. Buffers may be used to insure that the pH will be at the optimum level for the enzyme conversion. Among the applicable buffers are acetates, citrates, fumarates, or the salts of other weak acids. Reagents which will protect the enzyme from surface inactivation while also providing maximum activity may also be included. Such reagents include albumin, cysteine and other sulfhydryl (SH) containing materials.

Depending on the source of the enzyme, the pH level of the system may range from about 3 to 10, and preferably close to a value of 4.8, the latter level having been found to be the optimum value for the beta-amylase enzyme system, while the use of pH levels falling outside the above stated range has been observed to exert a deactivating effect on the enzyme. In general, we prefer to enzyme convert at as high a solids content as is feasible in order to facilitate subsequent recovery of the dry starch product. However, there is no restriction as to the applicable starch solids contents and they may range from such low levels as 5%, of the total weight of the suspension.

The enzyme is then added to the aqueous starch suspension and the mixture held at a temperature of from about 20 to 100° C., and preferably from about 45 to 55° C., until the desired level of digestion is reached. It should be noted that the rate of enzyme reaction is markedly reduced at room temperature while the enzyme is rapidly deactivated at temperatures in excess of about 100° C.

The resulting product may be isolated by spray drying, drum drying, solvent precipitation or any other known techniques for effecting dehydration.

It should be noted that variations may be made in the above described procedure without adversely affecting the low temperature stability of the resulting products. Thus, a combination consisting of the aqueous starch slurry, the enzyme and any desired additives may be passed through an agitated heat exchanger in which the starch is simultaneously swollen and partially digested, whereupon the resulting enzyme modified starch dispersion may be drum dried or spray dried to yield a dry powder consisting of the crosslinked modified starch or the resulting dispersion may be formulated directly into the desired food system.

Although the process of this invention makes exclusive use of beta-amylase as the enzyme component, it is to be noted that other enzyme systems, such as alpha-1,4 glucosidase, phosphorylase or any others which may hereinafter be discovered or become available, which exhibit the selectivity of beta-amylase in being able to split the 1,4 linkages of the starch molecule but not being capable of splitting the 1,6 linkages present therein, may also be effectively utilized therein and are intended to fall within the scope of the claims of this invention.

With regard to proportions, a broad range of concentrations of the beta-amylase enzyme may be utilized, with such factors as cost and the desired degree of degradation being of primary concern in selecting a specified enzme concentration. Such enzyme concentrations are defined in terms of units of beta-amylase wherein one unit of enzyme is defined as the amount required to liberate one micromole of maltose per minute at a temperature of 25° C.

The degree of starch degradation that is required to substantially improve the low temperature stability of the starch is also subject to variation. Although this value is dependent upon the type of starch utilized in the reaction as well as upon any substituent groups which may be present upon its molecule, values ranging from about 13 to 55%, by weight, of starch degradation will, in most instances, insure improved low temperature stability. The degree of starch degradation is ascertained by determing the amount of free maltose which has been liberated during the enzyme reaction and then employing the following relationship to calculate the percent of starch degradation.

Percent starch degradation $$= \frac{\text{grams of free maltose} \times 100}{\text{grams of total starch on a dry basis}}$$

It should be additionally noted that the maltose produced by the process of this invention can be easily separated from the swollen starch by centrifuging out the latter and recovering the maltose by crystallization. The resulting maltose shows a high purity superior to commercial "C.P." maltose as indicated by chromatographic comparisons, ease of crystallization, and melting point.

The following representative values clearly indicate this high degree of purity of the maltose thus obtained.

| | Specific rotation ($[\alpha]_D$) | Melting point of maltose phenyl-osazone, °C. |
|---|---|---|
| Representative sample of maltose resulting from the process of this invention | +130.0 | 206 |
| Values for maltose hydrate as reported in the literature | +130.4 | 206 |

As previously noted, the improved low temperature stability of the starch products resulting from the process of this invention is of particular value with respect to the use of such starches as ingredients of canned soups, pie fillings, frozen foods, thickeners and any other applications where starch is subjected to storage at low temperatures. In this connection, it is to be noted that recent nutritional studies have resulted in the discovery that the quality of canned foods is best maintained if the cans are stored at temperatures of about 40–60° F. Thus, at higher storage temperatures there tends to be a loss in vitamin content and nutritional value. The latter fact lends added importance to the starch products of this invention which, as has been shown, can readily withstand prolonged low temperature storage.

In the following examples, which further illustrate the embodiments of invention, all parts given are by weight unless otherwise specified.

EXAMPLE I

This example illustrates the preparation of a typical enzyme modified starch product of this invention as well as its improved low temperature stability.

A sample of waxy maize starch was inhibited by reaction with epichlorohydrin according to the procedure described in Example I of U.S. Pat. No. 2,500,950. The resulting inhibited waxy maize starch had a GSP value of 22.

An aqueous slurry of the inhibited waxy maize starch was then subjected to a drum drying process whereby it was passed over drums which were heated to a temperature which was sufficient to gelatinize and simultaneously dry the starch.

A suspension consisting of 30 parts of the above described crosslinked, pregelatinized starch in 600 parts of a 0.026 N aqueous acetate buffer solution having a pH of 4.8 was thereupon prepared. The temperature of this suspension was raised to 55° C. whereupon 94 units of beta-amylase were added thereto. The system was kept under continuous agitation for a period of one hour and, thereafter, 5 parts of 0.001 N mercuric chloride were added to deactivate the enzyme. The resulting starch suspension was then spray dried in order to recover the degraded product.

In order to determine the percent degradables in the resulting starch product, aliquots of the suspension were submitted to a colorimetric analytical procedure which employed 3,5-dinitrosalicylic acid as an indicator therein. It was thus determined that 16.6%, by weight, of the starch intermediate had been degraded.

In order to test the low temperature stability of the above prepared starch product, 6.6 parts thereof were slurried in 100 parts of a 1:1 water:cranberry juice mixture. This starch-juice mixture was cooked for 10 minutes in a boiling water bath whereupon 15 parts of sucrose were added. The cooked mixture was transferred to small containers, cooled to room temperature and then stored at a temperature of 0° C. The samples were removed daily and were on each occasion completely thawed and refrozen. Low temperature instability is indicated by a deterioration of clarity and texture as well as by the tendency towards syneresis. It should be noted that other fruit juices can be used in this procedure, but the use of cranberry juice provides a particularly severe test because of its high degree of acidity.

Upon subjecting the above described product to this freeze-thaw procedure, it was found to survive 14 cycles before showing the first indications of an increased opacity. This was in contrast to the control, i.e. the crosslinked, pregelatinized waxy maize starch which had not undergone the enzyme modification, which showed complete deterioration and syneresis after only 3–4 cycles. These results clearly indicate the improved low temperature resistance exhibited by the starch products resulting from the process of this invention.

The above described procedures were then repeated under identical conditions with the exception, in this instance, that 188 units of beta-amylase was utilized in the reaction and the reaction was allowed to continue for a period of 48 hours at 55° C. Analysis of the resulting starch product indicated that 52%, by weight, of the starch intermediate had been degraded. Upon being submitted to the freeze-thaw procedure, it survived without change for a total of 23 cycles.

EXAMPLE II

This example illustrates the use of a variety of starch bases in conducting the novel process of this invention. In each instance, the general preparative procedure set forth in Example I was utilized. Any variations in reagents or procedures are specified.

(A) In this instance, a waxy maize starch which had been inhibited to a GSP value of 22 by treatment with a 1:40 adipic acid:acetic anhydride mixture according to the procedure set forth in Example 13 of U.S. Pat. No. 2,461,139 was subjected to the enzyme modification treatment of this invention.

It was thereafter determined that 42%, by weight, of the starch intermediate had been degraded. When submitted to the freeze-thaw procedure described in Example I, hereinabove, it survived 15 cycles without change as contrasted with the control, i.e. the inhibited, pregelatinized intermediate, which only lasted 5 cycles.

(B) The starch base in this example was a waxy maize starch which had been inhibited to a GSP value of 19 by treatment with phosphorus oxychloride according to the procedure set forth in U.S. Pat. No. 2,328,537. Thereafter, the crosslinked waxy maize starch was reacted with 7.5%, by weight, of propylene oxide thereby yielding the hydroxypropyl ether derivative of the crosslinked waxy maize starch.

The gelatinization of the starch base was accomplished, in this instance, by suspending the starch in an acetate buffer solution, which contained cysteine therein, and then cooking the suspension in a boiling water bath for a period of 20 minutes. The suspension was cooled to 55° C. whereupon 1154 units of beta-amylase were added and the reaction allowed to continue, under agitation, for a period of 16 hours.

Analysis of the resulting starch suspension indicated that 31.5%, by weight, of the starch intermediate had been degraded. When submitted to the freeze-thaw procedure described in Example I, the resulting starch product survived 30 cycles while still remaining clear and transparent, with no deterioration in texture, and with no perceptible evidence of syneresis. Furthermore, the starch-cranberry juice-sugar mixture was stored at a temperature of 0° C. for an additional 3–4 months without exhibiting any change in appearance. This performance is to be contrasted with that of the control, i.e. of the crosslinked, hydroxypropyl derivative which had not undergone enzyme modification, which survived only 13 freeze-thaw cycles.

(C) The starch base in this example was a tapioca starch which had been inhibited to a GSP value of 13 by treatment with epichlorohydrin according to the procedure set forth in Example I of U.S. Pat. No. 2,500,950, and thereafter reacted with 4%, by weight, of acetic anhydride thereby yielding the acetate ester derivative of the crosslinked tapioca starch.

The latter starch product was suspended in an acetate buffer solution, which contained cysteine therein, and then cooked in a boiling water bath for 20 minutes. The suspension was cooled to 55° C. whereupon 1160 units of beta-amylase were added and the reaction allowed to continue, under agitation, for a period of 20 hours.

Analysis of the resulting product, which in this instance was recovered by means of an ethanol precipitation procedure, indicated that 29.6%, by weight, of the starch intermediate had been degraded. When subjected to the freeze-thaw evaluation procedure, it survived 15 cycles as contrasted with the control which survived only 5–6 cycles.

(D) The starch base in this example was a waxy sorghum starch which had been inhibited to a GSP value of 31 by treatment with phosphorus oxychloride according to the procedure set forth in U.S. Pat. No. 2,328,537.

The latter starch product was suspended in an acetate buffer solution and then cooked in a boiling water bath for a period of 20 minutes. The suspension was cooled to 55° C. whereupon 115 units of beta-amylase were added and the reaction allowed to continue, under agitation, for a period of 16 hours.

Analysis of the resulting starch suspension indicated that 50.0%, by weight, of the starch intermediate had been degraded. When subjected to the freeze-thaw evaluation procedure, the degraded starch product survived 14 cycles before exhibiting a thinner viscosity as contrasted with the control which survived only 2 cycles before exhibiting a similar appearance.

(E) The starch base in this example was a waxy maize starch which had been inhibited to a GSP value of 10 by treatment with a glycine-sodium hypochlorite reagent according to the procedure set forth in our copending application Ser. No. 580,884, filed Sept. 21, 1966 and assigned to the assignee of the subject application. It should be noted that as a result of this inhibition procedure, the waxy maize starch contained thermally sensitive crosslinkages.

A suspension comprising 90 parts of the latter starch intermediate in 610 parts of an aqueous acetate buffer solution was prepared and cooked in a boiling water bath for a period of 30 minutes. The suspension was cooled to 40° C. whereupon 115 units of beta-amylase were added and the reaction allowed to continue, under agitation, for a period of 20–24 hours.

Analysis of the resulting starch suspension indicated that 47.0%, by weight, of the starch intermediate had been degraded. The degraded starch product was isolated from the suspension by means of an alcohol precipitation technique and thereafter subjected to the freeze-thaw evaluation procedure. It should be noted that, in this instance, the starch-juice mixtures were pressure cooked for a period of 20 minutes at a pressure of 15 p.s.i. in contrast to the usual cooking procedure utilized in such evaluations. Results of the freeze-thaw evaluation indicated that the above described starch product survived 24 cycles without change in contrast to the control which survived only 2 cycles.

EXAMPLE III

This example provides a direct contrast between the results obtained in utilizing the specified crosslinked, pregelatinized starch intermediates in the enzyme conversion process of this invention and those obtained by the use, therein, of raw starch bases and ungelatinized crosslinked starch bases.

(A) The procedure described in Example I, hereinabove, was repeated with the exception that various raw starches were, respectively, substituted for the crosslinked, waxy maize starch originally utilized therein. In all instances, the use of the raw starches provided unworkable limit dextrins which did not exhibit improved low temperature stability. Thus, for example, the use of corn starch provided an easily retrogradable, pulpy, non-cookable product. The use of both potato and waxy maize starch provided limit dextrins which exhibited undesirable cohesive solutions. Furthermore, the limit dextrin derived from potato starch survived only 3 freeze-thaw cycles.

(B) The procedure described in Example I was again repeated with the exception, in this instance, that the inhibited waxy maize starch was not swollen, i.e. it was not subjected to the drum drying gelatinization procedure. The resulting product was found to have been degraded to the extent of only 12.6%, by weight. Furthermore, there was no improvement of its low temperature stability as compared with the control, both samples surviving only 3–4 freeze-thaw cycles.

The results presented hereinabove clearly indicate the necessity for using only the specified gelatinized, modified starch intermediates in the process of this invention.

Summarizing, it is thus seen that this invention provides for the preparation of improved starch products whose aqueous dispersions are notably resistant to syneresis, loss of clarity, and deterioration of texture upon being subjected to prolonged periods of low temperature and/or to repeated freezing and thawing.

Variations may be made in proportions, procedures and materials without departing from the scope of this invention which is defined by the following claims.

We claim:

1. A method for preparing starch products whose aqueous dispersions are characterized by improved stability and resistance to syneresis and gelling when exposed to storage at low temperatures, said method comprising the steps of: (1) reacting a starch base with the inhibiting reagent in quantity to produce inhibited intact starch granules having a granule swelling power in the order from 10 to 31; (2) swelling the inhibited intact starch granules; and (3) reacting the resulting swollen inhibited starch with an enzyme wherein said enzyme is selected from the group consisting of beta-amylase, alpha-1,4 glucosidase and phosphorylase, which enzyme splits the 1,4 linkages of the starch molecule but is not capable of splitting the 1,6 linkages present therein.

2. The method of claim 1, wherein said enzyme reaction is conducted at a pH level of from about 3 to 10.

3. The method of claim 1, wherein said enzyme is beta-amylase.

4. The method of claim 1, wherein said inhibiting reagent is selected from the group consisting of aliphatic dihalides, ether-forming epoxy halogen compounds, cyanuric chloride, phosphorus oxychloride, metaphosphates, polymetaphosphates, formaldehyde, acrolein, formaldehyde containing resins and prepolymers, succinic anhydride, mixtures of adipic acid and acetic anhydride, mixtures of citric acid and acetic anhydride, and glycine-chlorine inhibition reagents.

5. The method of claim 1, wherein said inhibited starch base contains substituent groups selected from the group consisting of ether and ester groups.

6. A degraded starch product, whose aqueous dispersions are characterized by improved stability and resistance to syneresis and gelling when exposed to storage at low temperatures, comprising a swollen starch inhibited by reaction with a crosslinking agent containing at least two functional groups which react with at least two available hydroxy groups of the starch molecule so that the resulting crosslinked starch has a granule swelling power in the order of from 10 to 31, said swollen inhibited starch degraded to the extent of from about 13 to 55%, by weight, by reaction with an enzyme wherein said enzyme is selected from the group consisting of beta-amylase, alpha-1,4 glucosidase and phosphorylase, which enzyme splits the 1,4 linkages of the starch molecule but is not capable of splitting the 1,6 linkages present therein.

7. The degraded starch product of claim 6, wherein said crosslinking agent is selected from the group consisting of aliphatic dihalides, ether forming epoxy halogen compounds, cyanuric chloride, phosphorus, oxychloride, metaphosphates, polymetaphosphates, formaldehyde, acrolein, formaldehyde containing resins and prepolymers, succinic anhydride, mixtures of adipic acid and acetic anhydride, mixtures of citric acid and acetic anhydrde, and glycine-chlorine inhibition reagents.

8. The degraded starch product of claim 6, wherein said swollen inhibited starch contains substituent groups selected from the group consisting of ether and ester groups.

9. A starch containing food product characterized by its improved stability and resistance to syneresis and gelling when exposed to storage at low temperatures, said food product comprising a mixture of non-starch ingredients together with a swollen starch inhibited by reaction with a crosslinking agent containing at least two functional groups which react with at least two available hydroxy groups of the starch molecule so that the resulting crosslinked starch has a granule swelling power in the order of from 10 to 31, said swollen inhibited starch degraded to the extent of from 13 to 55%, by weight, by reaction with an enzyme wherein said enzyme is selected from the group consisting of beta-amylase, alpha-1,4 glucosidase and phosphorylase, which enzyme splits the 1,4 linkages of the starch molecule but is not capable of splitting the 1,6 linkages present therein.

10. The food product of claim 9, wherein said crosslinking agent is selected from the group consisting of aliphatic dihalides, ether forming epoxy halogen compounds, cyanuric chloride, phosphorus oxychloride, metaphosphates, polymetaphosphates, formaldehyde, acrolein, formaldehyde containing resins and prepolymers, succinic anhydride, mixtures of adipic acid and acetic anhydride, mixtures of citric acid and acetc anhydride, and glycerine-chlorine inhibition reagents.

11. The food product of claim 9, wherein said swollen, inhibited starch contains substituent groups selected from the group consisting of ether and ester groups.

References Cited

UNITED STATES PATENTS

| | | | |
|---|---|---|---|
| 3,369,910 | 2/1968 | Ganz et al. | 99—139 |
| 3,332,786 | 7/1969 | Edlin et al. | 99—139 |
| 3,278,522 | 10/1966 | Goldstein | 260—233.3 |

A. LOUIS MONACELL, Primary Examiner

M. D. HENSLEY, Assistant Examiner

U.S. Cl. X.R.

99—139; 128—32; 260—233.3